United States Patent
Wolf et al.

[11] Patent Number: 5,433,252
[45] Date of Patent: Jul. 18, 1995

[54] FLUID CONTAINING COAXIAL TUBE FOR CONTROL SYSTEMS

[75] Inventors: Franz J. Wolf, Bad Soden-Salmünster; Uwe Reichert, Schlüchtern, both of Germany

[73] Assignee: WOCO Franz-Josef Wolf & Co., Bad Soden-Salmunster, Germany

[21] Appl. No.: 23,835

[22] Filed: Feb. 23, 1993

[30] Foreign Application Priority Data

Feb. 27, 1992 [DE] Germany .................... 42 06 096.6

[51] Int. Cl.⁶ .............................................. F16L 59/12
[52] U.S. Cl. .................................. 138/113; 138/111; 138/114; 285/133.1
[58] Field of Search .............. 138/103, 110, 108, 111, 138/113, 114, 115, 116, 148; 285/133.1

[56] References Cited

U.S. PATENT DOCUMENTS

| | | | |
|---|---|---|---|
| 3,173,196 | 3/1965 | Grimm | 138/114 |
| 3,240,233 | 3/1966 | Johnston | 138/108 |
| 3,581,776 | 6/1971 | Sheahan | 138/113 |
| 3,756,244 | 9/1973 | Kinnear et al. | 138/114 |
| 4,192,352 | 3/1980 | Hakamada et al. | 138/110 |
| 4,688,890 | 8/1987 | DeMeo et al. | 138/108 |
| 4,729,652 | 3/1988 | Sweeney | 138/113 |
| 4,745,238 | 5/1988 | Kotthaus et al. | 138/111 |
| 4,840,623 | 6/1989 | Quackenbush | 138/108 |
| 4,892,442 | 1/1990 | Shoffner | 138/108 |
| 4,906,496 | 3/1990 | Hosono et al. | 138/113 |

FOREIGN PATENT DOCUMENTS

| | | | |
|---|---|---|---|
| 462059 | 9/1947 | Canada | 138/113 |
| 376328 | 5/1964 | Switzerland | 138/113 |

*Primary Examiner*—James E. Bryant, III
*Attorney, Agent, or Firm*—Lowe, Price, LeBlanc & Becker

[57] ABSTRACT

The invention concerns a dimensionally stable, elastically bending plastic coaxial tube for fluids, consisting of an outer tube and of at least one inner tube mounted in said outer tube in hermetically fluid-tight but separate manner, said inner tube being held in position in essentially coaxial manner relative to the said outer tube by means of spacers between, and integral with, the constituent tubes, each spacer being integral with only one of the constituent tubes and being so configured and arrayed that the outer tube and the inner tube are freely axially displaceable relative to each other at least to some limited extent.

The coaxial tube is manufactured in that the inner tube is prefabricated, in particular by extrusion, and in that the outer tube is molded in-situ around the cooled inner tube, in particular by coaxial sheath extrusion.

12 Claims, 2 Drawing Sheets

FLUID CONTAINING COAXIAL TUBE FOR CONTROL SYSTEMS

TECHNICAL FIELD

The present invention relates to elastically bendable plastic tubes for fluids, for use in pneumatic servo and control systems.

BACKGROUND ART

A known extruded coaxial tube is manufactured in an integral manner, wherein the inner tube is rigidly joined to the outer tube by in-between spacers which are present as integral longitudinal ribs. This type of coaxial tube can be used in pneumatic servo and control systems to connect the servo and control components to spatially separate actuators. In these applications, the coaxial tube must be hermetically sealed and reliably tight with respect to the fluids, and must also be pressure-resistant. Not only must the outer tube be fluid-tight with respect to the inside, but also the inner tube must be tight with respect to the outer tube.

It is further known to use twin conduits with axially parallel constituent-tubes to load bifunctional fluid setting components, where said constituent-tubes are separated by a partition as regards the fluids while being mechanically joined.

Such twin and coaxial tubes also are being used in the automotive industry, for instance to actuate or control single-function or multi-function setting or control components which are pneumatically driven by pressure or partial vacuum. Such twin and/or coaxial tubes are especially appropriate for centralized locking systems because both the setting pressure required for the simultaneous opening and closing of vehicle doors, and the anti-theft control pressure must both be supplied.

Ever more vehicle functions are being remote-controlled electrically, pneumatically or hydraulically in automotive engineering. Consequently ever more cables, tubes and conduits are required to carry out and monitor the pertinent functions. At the same time, however, the space to pass through such cables and conduits is limited; consequently, such cables and conduits must have small radii of curvature. If the curvatures become less than a threshold defined by the elasticity of the particular material being used, hair cracks arise at the bends of the known, integrally extruded, multi-functional tubes, that is, in the known coaxial tubes and related twin conduits, from which ensue leakages and malfunctioning.

When using twin conduits, another problem arises, namely that the available sizes are insufficient with respect to vehicles for the large numbers used of conduits or tubes. The available diameter is inherently limited by design and cannot be arbitrarily enlarged.

Based on this state of the art, the object of the present invention is to create a plastic, dimensionally stable but elastically bendable coaxial tube for fluids, which can be reliably manufactured to evince good flexibility and which are tight to pressurized fluids and which furthermore also shall remain absolutely tight when being bent by small radii, as a result of which the two constituent-tubes shall be hermetically separated from each other as regards the fluids even under adverse circumstances.

SUMMARY OF THE INVENTION

The coaxial tube of the invention comprises a fluid-tight outer tube and a fluid-tight inner tube with spacers between the tubes. The spacers maintain the inner tube at least substantially coaxial with the outer tube. The outer tube is separated in hydrodynamically fluid-tight manner from the inner tube. In an essential feature of the invention, the outer and inner tubes however are also physically separated from each other since each spacer is integral only with the outer tube or the inner tube. The spacers are configured and integral in such manner that the inner tube and the outer tube are able in a limited way to freely axially shift relative to each other. The axial displaceability of the two constituent tubes relative to one another illustratively can be restricted by the spacers interlocking each other axially.

The mechanically separate inner and outer tubes offer the special advantage that when bending the coaxial tube, no stress peaks shall be generated between the tubes, as occurs with prior art spacers that rigidly join the outer and inner tubes. As a result, hair cracks in the tube walls are prevented and hence coaxial-tube integrity and functional reliability are assured.

The coaxial tube of the invention is comprised of a plastic so flexible that even bends with small radii of curvatures can be formed in the tube without entailing operational degradation.

In a preferred embodiment mode of the invention, the spacers are shaped as axially parallel longitudinal ribs and are mounted in a radially projecting manner between the inner tube and the outer tube.

Furthermore, the longitudinal ribs may also be configured in such a way that, beginning at the outer tube, their radially inside edges shall not rest against the inner tube, or at least that they rest against it with a narrow-tolerance spacing, but that instead their sides touch the inner tube tangentially and while being tangentially prestressed. As a result, the inner tube is centered and elastically supported in the outer tube. A similar elastic effect also can be achieved by arranging the longitudinal ribs as radially directed spirals.

In one advantageous embodiment mode of the invention, the spacers are bulges in the form of hemispheres or spherical segments. The round form of the site where the spacer touches, or almost touches, that constituent tube not integrally joined to it, offers the advantage that axial relative displacement between inner and outer tubes encounters little friction while nevertheless the inner tube is especially firmly held in place radially. In another embodiment mode of the invention the spacers also may form ribs extending along helical paths or along an axial sequence of circular lines.

In yet another embodiment mode of the invention, the spacers are spaced at equal angles from each other in the circumferential direction of the coaxial tube. This feature offers the advantage that, in addition to the centering of the inner tube inside the outer tube simultaneously achieved thereby, the distribution of the forces or stresses will be uniform when the coaxial tube is being bent and therefore homogeneous elasticity to bending will be achieved in all directions of the coaxial tube. Therefore there are no directions in which it will be easier or more difficult to bend the tube or to deform it in some other way.

In still another embodiment mode of the invention, either all the spacers are integral with the inside surface of the outer tube and do extend at least essentially radially toward the outer surface of the inner tube, or all spacers are integral with the outside surface of the inner tube and extend radially toward the inside surface of the outer tube, or deviate no more than by slight angles from such radial direction. When all spacers are integral with only one of the constituent tubes, then advantageously thereby the inner tube is freely displaceable relative to the outer tube both axially and circumferentially. This design of the spacers therefore allows maximum axial displaceability and consequently averts inhomogeneous stress concentrations when bending the coaxial tube.

It may be advantageous that the spacers be alternatingly integral in the circumferential direction of the coaxial tube with the inside surface of the outer tube and the outside surface of the inner tube, and preferably in this case each spacer shall extend essentially radially from the constituent tube with which it is integral to the constituent tube with which it is not. Axial displaceability is not degraded thereby, whereas, at the same time, the inner tube is more or less secured against rotation relative to the outer tube.

Limits on axial shifts between the constituent tubes can be achieved by so mounting the spacers integral with the inside surface of the outer tube and with the outside surface of the inner tube in such a way that they shall interlock axially. This permits limiting the axial displaceability of the outer tube relative to the inner tube without thereby degrading the ease of slippage between the spacers and the constituent tube with which they are not integral that is required for free axial displacement.

In the method of the invention, first the inner tube is manufactured separately, preferably by extrusion, and then it is cooled. Only thereupon will the outer tube be shaped in a second extrusion station in the direction of extrusion around the inner tube, and in particular this will be done using the technique of coaxial sheath extrusion. Accordingly, approximately in the manner of cable-sheath manufacture, first the inner tube corresponding to the core is pre-fabricated and then the outer tube corresponding to the sheath is extruded around it. Because the inner tube is not initially surrounded by the outer tube, this pre-fabricated inner tube can be cooled when it leaves the extruder, possibly it may also be fitted with a special coating to increase ease of slippage, and as a result it will be already sufficiently cold and solid in either case, so that, during the ensuing molding of the outer tube around the inner tube, neither the wall thickness of the inside tube will be lessened or changed, nor is the outer tube able to bond to the inner one. This feature also applies to the spacers which may be integral as well with the outer tube as with the inner tube. Therefore if all or part of the spacers are integral with the inner tube, then they shall be also cooled when the inner tube is, and again they neither can bond to the outer tube with possibly its own integral spacers.

BRIEF DESCRIPTION OF THE DRAWINGS

The invention is elucidated below in relation to embodiment modes and the drawings, which are not to scale.

DETAILED DESCRIPTION OF THE INVENTION

Figure 1:
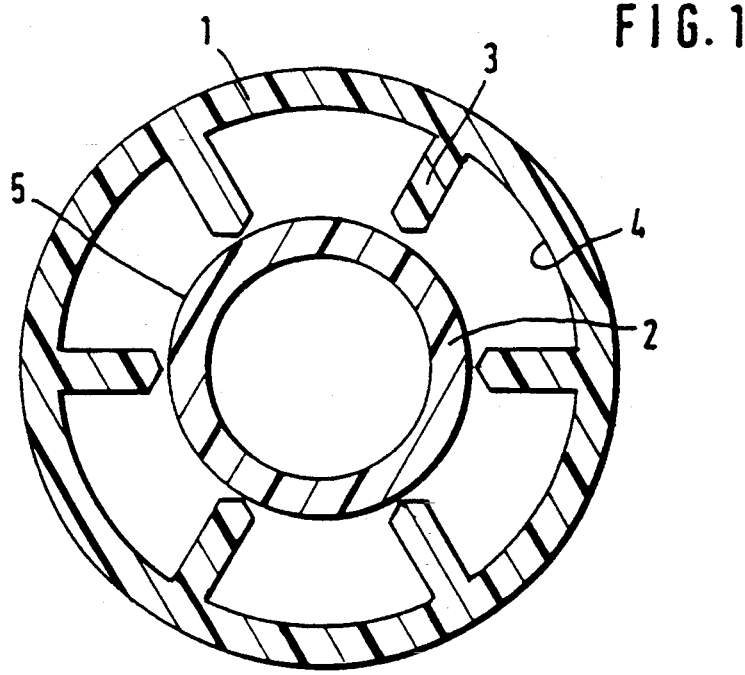
FIG. 1 is a cross-section of an embodiment mode of the coaxial tube with spacers solely integral with the outer tube and in form of longitudinal ribs.

In FIG. 1, there are six spacers 3 which are all integral with the outer tube 1 and which extend radially from the inside surface 4 of the outer tube 1 toward the outside surface 5 of the inner tube 2. The edges of the spacers, shaped as longitudinal ribs facing the outside surface 5 of the inside tube 2, in this case are shown converging as sharp edges, though they may also be dull or chamfered. The spacing between the more or less rounded off spacers 3 and the inner tube 2 is selected to be such that on one hand the inside tube 2 shall be freely displaceable axially within the outside tube 1, but that on the other hand the gap between the spacers 3 and the outside surface 5 of the inside tube 2 shall not become excessive. The dimensions of the wall thicknesses of the outside tube 1, of the inside tube 2 and of the spacers 3 are so selected that both high coaxial-tube flexibility and absolute separation of the outer tube 1 from the inner tube 2 shall be assured. By varying the thickness and number of the spacers 3 and by varying the wall thicknesses of the inner tube 2 and the outer tube 1, it is possible to control furthermore the amount of material required to make the coaxial tube, with appropriate effects on production costs.

Figure 2:
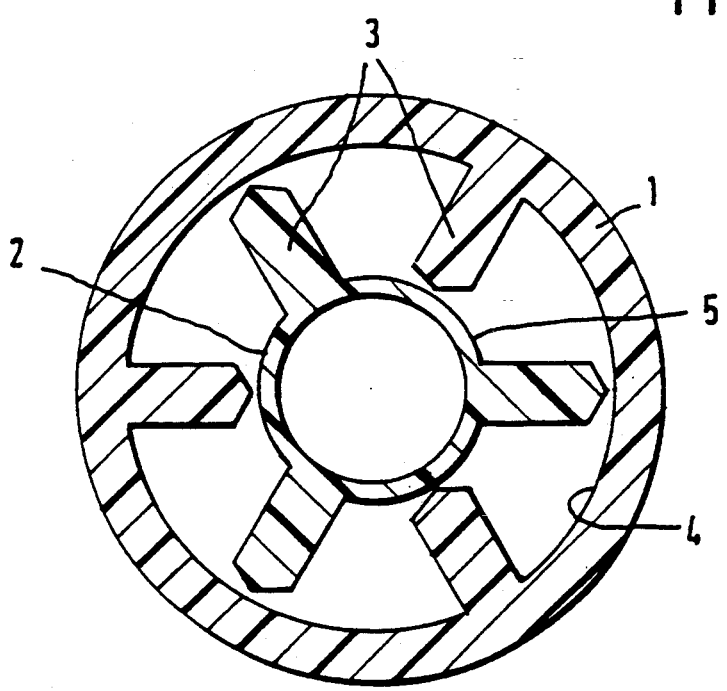
FIG. 2 is a cross-section of another embodiment mode of the coaxial tube with spacers in the form of longitudinal ribs alternatingly integral with the inner and the outer tubes.

FIG. 2 is a cross-section of another embodiment mode of the coaxial tube, which, as was the case for the embodiment of FIG. 1, is not shown to scale. The spacers 3 are in the form of longitudinal ribs and are alternatingly integral with the outside surface 5 of the inner tube 2 and with the inside surface 4 of the outer tube 1, each extending radially outward and inward toward the outer tube 1 and the inner tube 2 resp. The relation of the diameters of the outer tube 1 and of the inner tube 2 is not shown to scale. Again, the shape of the spacers 3 not joined to one of the constituent tubes 1 or 2 may deviate from the obtuse, conical shape shown in this Figure. On account of the spacers 3 being alternatingly integral 2 with the inside tube 2 and the outside tube 3, the axial displaceability of the two constituent tubes remains unaffected, rotation however being restricted.

Figure 3:
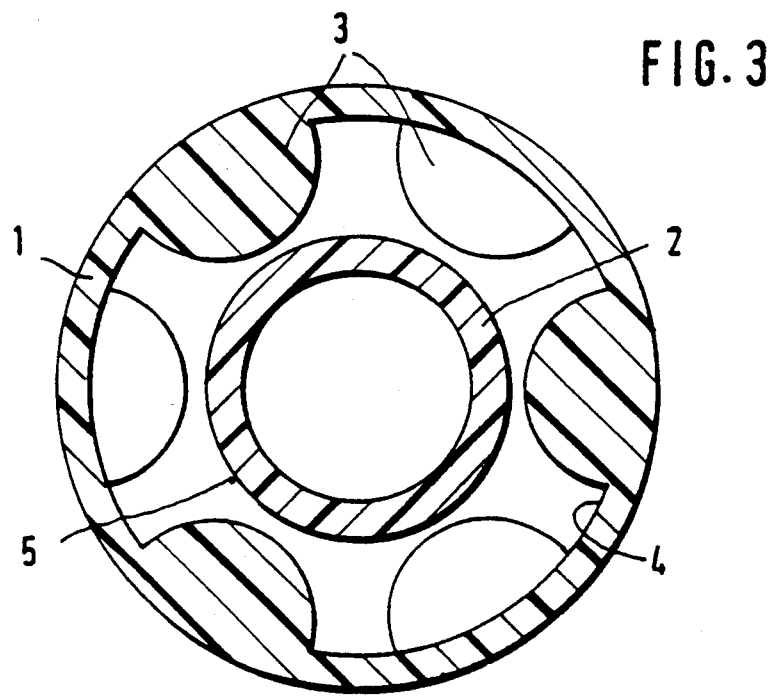
FIG. 3 is a cross-sectional another embodiment mode of the coaxial tube wherein bulging spacers are integral with the outer tube and are axially mutually offset.

FIG. 3 shows a coaxial tube of which the spacers 3 are all integral with the outside tube 1. The spacers 3 are in the form of semi-spherical bulges, or of sphere segments. These bulges may be arranged in such manner that for instance half the bulges are arrayed in a first angular attitude at equal angular spacings in a first series of circumferential circles, whereas the other half of the bulges is arrayed at an offset angular attitude in a second series of axially offset circumferential circles. In the embodiment of FIG. 3, the bulges also may be arrayed in more than two mutually offset sequences of angular attitudes.

Figure 4:
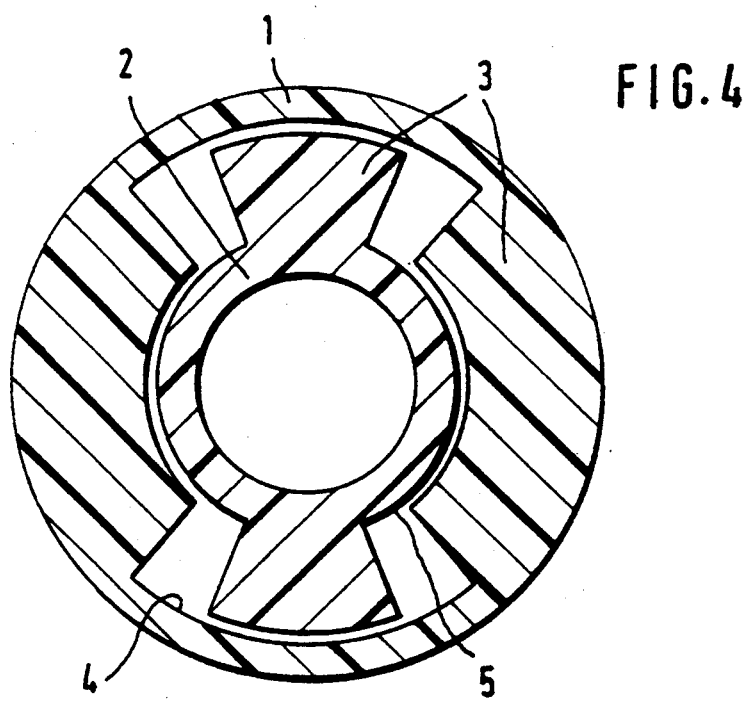
FIG. 4 is a cross-section of another embodiment mode of the coaxial tube wherein the ribs extending circularly are alternatingly integral with the outer and the inner tubes.

In the cross-sectional embodiment mode of FIG. 4, the spacers 3 are alternatingly integral with the outer tube 1 and the inner tube 2 and are in the form of disk sectors in the radial plane of the coaxial tube. For the angular position of the inner tube 2 relative to the outer tube 1 shown in FIG. 4, the inner tube 2 will be freely axially displaceable inside the outer tube 1. Following rotation by 90°, on the other hand, the two sets of spacers will engage one behind the other and as a result the axial displaceability between the two constituent tubes 1,2 will be limited without however going to null.

We claim:

1. A dimensionally stable, elastically bending plastic coaxial tube for bifunctional fluid setting components in pneumatic servo and control systems, comprising an outer tube and at least one inner tube mounted in a separate but hermetically fluid-tight manner inside and with respect to said outer tube, each of said inner and outer tubes being adapted to contain a fluid for functional use in said pneumatic servo and control systems, said inner tube being kept at least substantially coaxially to the outer tube by means of spacers between the inner and outer tubes, wherein each of the spacers is integral with only one of the inner and outer tubes and is so configured and arrayed that the outer tube and the inner tube are mutually axially displaceable at least to a limited extent.

2. A coaxial tube as defined in claim 1, wherein the spacers are axially parallel longitudinal ribs.

3. A coaxial tube as defined in claim 1, wherein the spacers are hemispherical bulges or bulges in the form of segments of spheres.

4. A coaxial tube as defined in claim 1, wherein the spacers are ribs following helical lines or ribs along an axial sequence of circles.

5. A coaxial tube as defined in claim 1, wherein the spacers are angularly equidistant in the circumferential direction of the coaxial tube.

6. A coaxial tube as defined in claim 1, wherein all the spacers are integral with the inside surface of the outer tube and extend at least substantially radially toward the outside surface of the inner tube, or, inversely, that all spaces are integral with the outside surface of the inner tube and extend at least substantially radially toward the inside surface of the outer tube.

7. Application of the coaxial tube defined in claim 1 for the pneumatic twin control of servo or adjustment components for the separate setting and locking control means in automotive engineering.

8. The coaxial tube of claim 1, wherein the spacers are longer in the radial direction of the tubes than their width in the circumferential direction.

9. The coaxial tube of claim 1, wherein the thickness of the inner or outer tube walls is less than the length of the spacer in the radial direction.

10. The coaxial tube of claim 8, wherein the thickness of the inner or outer tube walls is less than the length of the spacer in the radial direction.

11. The coaxial tube of claim 1, wherein said inner and outer tubes are extruded structures.

12. The coaxial tube of claim 11, wherein said tubes are coaxial sheath extruded structures.

* * * * *